United States Patent [19]

Lu et al.

[11] Patent Number: 5,891,552
[45] Date of Patent: *Apr. 6, 1999

[54] PRINTED PLASTIC FILMS AND METHOD OF THERMAL TRANSFER PRINTING

[75] Inventors: Pang-Chia Lu, Pittsford; Gordon Leonard Musclow, Henrietta, both of N.Y.

[73] Assignee: Mobil Oil Corporation, Fairfax, Va.

[ * ] Notice: The term of this patent shall not extend beyond the expiration date of Pat. No. 5,776,604.

[21] Appl. No.: 705,349

[22] Filed: Sep. 11, 1996

Related U.S. Application Data

[63] Continuation-in-part of Ser. No. 582,819, Jan. 4, 1996, Pat. No. 5,776,604.

[51] Int. Cl.$^6$ .......................... B41M 5/035; B41M 5/26; B32B 3/00
[52] U.S. Cl. ..................... 428/195; 428/516; 428/520; 101/487; 101/488; 101/492
[58] Field of Search .................... 428/343, 515, 428/520, 326, 327, 331, 195, 516; 101/21, 25, 31, 487, 488, 492; 427/388.4, 384; 400/120.01

[56] References Cited

U.S. PATENT DOCUMENTS

| | | | |
|---|---|---|---|
| 3,753,769 | 8/1973 | Steiner | 117/122 H |
| 4,226,754 | 10/1980 | Yun et al. | 260/29.6 TA |
| 4,749,616 | 6/1988 | Liu et al. | 428/331 |
| 4,887,097 | 12/1989 | Akiya et al. | 346/135.1 |
| 5,028,480 | 7/1991 | Dean | 428/314.4 |
| 5,166,242 | 11/1992 | Chu et al. | 524/238 |
| 5,233,924 | 8/1993 | Ohba et al. | 101/483 |
| 5,244,861 | 9/1993 | Campbell et al. | 503/227 |
| 5,288,548 | 2/1994 | Weber | 428/315.9 |
| 5,330,831 | 7/1994 | Knoerzer et al. | 428/353 |
| 5,350,733 | 9/1994 | Campbell et al. | 503/227 |
| 5,380,587 | 1/1995 | Musclow et al. | 428/353 |
| 5,387,574 | 2/1995 | Campbell et al. | 503/227 |
| 5,399,218 | 3/1995 | Harrison et al. | 156/229 |
| 5,451,460 | 9/1995 | Lu et al. | 428/349 |
| 5,494,745 | 2/1996 | Vander Velden et al. | 428/354 |

FOREIGN PATENT DOCUMENTS 0 317 166 A2  11/1988  European Pat. Off. .

OTHER PUBLICATIONS

"Materials for Thermal Transfer Printing," E. Anczurowski et al., J. Of Imaging Tech., vol. 13, No. 3 (Jun. 1987).

*Primary Examiner*—Paul Thibodeau
*Assistant Examiner*—D. Lawrence Tarazano
*Attorney, Agent, or Firm*—Ronald A. Bleeker; Dennis P. Santini; Romulo H. Delmendo

[57] ABSTRACT

A process for thermal transfer printing on plastic films incorporating a coating composition is provided. The process includes providing plastic film having a coating composition including a binder of a polymer and/or copoylmer of carboxylic acid containing vinylic unsaturation, at least one finely divided particulate filler, and a surface active agent. A thermographic element such as a ribbon which includes a dye layer is then heated in the form of an image to be printed onto the plastic film, with the heating causing the dye layer to melt in the form of the image. The plastic film coated with the coating composition is contacted with the thermographic ribbon, and the dye layer is transferred from the ribbon to the plastic film. Such thermal transfer printing on coated plastic films provides for a multitude of uses such as plastic labels for outdoor use.

7 Claims, No Drawings

PRINTED PLASTIC FILMS AND METHOD OF THERMAL TRANSFER PRINTING

This application is a continuation-in-part of U.S. application Ser. No. 08/582,819 filed Jan. 4, 1996, now U.S. Pat. No. 5,776,604.

FIELD OF THE INVENTION

This invention relates to a coating composition which enhances the printability of plastic surfaces, particularly plastic films. More particularly, the present invention relates to a method of thermal transfer printing which incorporates the use of a coating composition to improve such printing on plastic films.

BACKGROUND OF THE INVENTION

A number or printing techniques and processes have been developed for use with non-plastic substrates such as paper and the like. Plastic substrates, on the other hand, inherently have a host of factors which must be considered when used as printing surfaces. Many conventional printing processes have not been entirely successful and have suffered from a number of disadvantages, such as smearing and smudging of the ink due to the smooth surface of the plastic, high static, poor scratch resistance and the like.

Lithography is the process of printing from a specially prepared printing plate. The image areas of the plate are treated to accept ink, while the non-image areas, when moistened with water, repel ink. The areas which accept ink form the printed image and the ink repelling areas form the background. Because the process is based on the principal that oil and water do not mix, the ink is oily or greasy. The image is typically formed on a lithographic printing plate by mounting a photosensitive film having hydrophobic and hydrophilic areas onto an aluminum plate. A reverse print image is placed above the photosensitive film and upon exposure to UV light, the reverse image transfers to the photosensitive film to form the hydrophobic and hydrophilic areas of the printing plate.

During the printing process, the printing plate is continuously wetted with water and ink. The water is selectively taken up by the hydrophilic areas and the ink by the oleophilic areas of the printing surface. The ink is continuously conveyed from an ink source by means of a series of rollers to the printing plate located in the printing press, usually on a plate cylinder. Image portions of the printing plate that accept ink transfer the ink to a blanket cylinder as a reverse image. A portion of the ink from the blanket cylinder is then transferred to form a correct reading image on paper. The image formed by the lithographic printing ink hardens by exposure to air, in a process known as curing.

Lithographic ink is a dispersion of pigment in a viscous oil medium. One type of ink contains a drier, which accelerates curing of the medium after printing. There are also solventless inks which can be cured by UV and electron-beam radiation. Typically curing occurs upon exposure to air for a length of time ranging up to 24 hours. Printed paper can be formed into a stack or wound into a roll for curing without concern for smearing because the ink forming the image penetrates the spaces between the fibers forming the paper.

Although lithographic printing provides the advantages of allowing fine print and good detail, it has not been used with plastic films. Because plastic films have smooth surfaces the ink tends to smear when the film is wound into a roll or formed into a stack. Also, the ink tends to transfer to the backside of adjacent sheets in a roll or stack. Because it is economically impractical to allow the ink to cure before rolling or stacking the film, lithographic printing has not been used for plastic films. Additionally the high static associated with plastic films tends to make stack press printing impractical because of machine jamming.

In recent years, thermal transfer printing processes have been developed to satisfy "on-demand" type printing requirements. Thermal transfer printing, however, has also typically been limited to print surfaces composed of paper as opposed to plastic surfaces. This is primarily due to the poor print quality and poor durability of plastic surfaces in thermal transfer printing processes. In thermal transfer printing processes, a print surface substrate is provided for printing thereon, and a thermal element in the form of a printing head is provided for transferring the image to the substrate. A thermographic ribbon which includes a solid ink thereon is disposed between the print surface substrate and the print head. The print head includes a plurality of heating elements which can be individually heated in the desired image for printing. In operation, the thermographic ribbon is sandwiched between the print head and the print surface substrate, causing the print head to contact the thermographic ribbon which in turn contacts the print surface substrate. The individual heating elements of the print heat are heated in the image desired to be printed. Such sandwiching and heating simultaneously applies pressure and heat to the thermographic ribbon, which causes the solid ink contained on the thermographic ribbon to be melted or liquefied at the portions of the print head which are being heated. Since the thermographic ribbon is in contact with the print surface substrate, the melted ink is transferred from the thermographic ribbon to the print surface substrate in the form of the image desired.

While thermal transfer printing processes have become popular, such processes have traditionally been used mainly with paper substrates, due to the difficulty in printing on plastic films and the high cost associated with such films. For example, commercial products such as product numbers 01-180 and 01-181 marketed by Madico Graphic Films, Woburn, Mass., and Kimdura K-100 marketed by Kimberly Clark are printable polymer films useful in thermal transfer printing processes. While such films have proved to be useful alternatives to paper, they are significantly more expensive than paper, and are therefore inefficient in "on-demand" type printing use due to cost considerations.

U.S. Pat. No. 5,233,924 to Ohba et al. describes a "synthetic paper" type product which is an example of an alternative substrate described as useful in thermal transfer printing processes. This patent discloses a finely porous opaque polyolefin film layer incorporating an inorganic fine powder, with an ethylene-vinyl alcohol copolymer film layer on one or both sides of the polyolefin film layer, and further including a coat layer such as an inorganic material. While such films have proven to provide adequate print quality in thermal transfer printing, the high cost of these materials results in a significant downside to their use. Additionally, the smooth surface of the ethylene-vinyl alcohol copolymer appears to be a hinderance in many printing applications.

Flexographic printing and rotogravure printing techniques have been used to print onto plastic films. In these processes a solvent or water based ink is employed. Prior to winding the printed film into a roll or forming a stack, the ink is dried by passing the film sheet through an oven. These printing processes require a printing plate which is expensive to prepare and expensive drying ovens.

The use of thermoplastic stretch wrap films in the overwrap packaging of goods, and in particular, the unitizing of paletted loads is a commercially important use for polymer films. In these applications, the film is wrapped around the load or goods to be packaged and the film is continuously subjected to a stretching or tensioning force as it wraps around the load. This type of packaging, is useful for shipping goods since it contains goods as a unit and is resistant to moisture. Since, during shipping, the wrapped packages are exposed to outside conditions, the entire packaging assembly is likely to be subjected to extremes of moisture, heat and light. Laminated paper packaging labels containing shipping and product information are acceptable for outdoor use but they pose problems in the recycling of the stretch wrap. The paper labels must be removed prior to recycling. Therefore, the development of lithographic and thermal transfer printable plastic labels which are resistant to moisture, heat and light and which are relatively inexpensive to produce is important.

SUMMARY OF THE INVENTION

The invention is directed to a printable coating composition which comprise an acrylic-based emulsion which includes inorganic particulates and a surfactant. In one embodiment, the invention includes an ultra violet light stabilizer additive. The special coating formulation of this invention overcomes prior difficulties in the printing, especially lithographic and thermal transfer printing, of plastic films.

DETAILED DESCRIPTION OF THE INVENTION

The printable coating composition of the present invention comprises an acrylic binder containing particulates and a surfactant.

The acrylic binder contemplated comprises a thermoplastic polymer or copolymer of a carboxylic acid containing vinylic unsaturation such as acrylic acid or methacrylic acid or ester of those acids. The acrylates contemplated contain lower alkyl groups such as those ranging from about 1 to about 16 carbon atoms, specific examples include methyl, ethyl, butyl, lauryl and stearyl. Useful acrylic resins may be modified with non-acrylic monomers such as acrylonitrile, butadiene and/or styrene.

Acrylic polymer binders are well known in the art and are described in U.S. Pat. Nos. 3,753,769; 4,058,645 and 4,749,616.

A particularly useful thermoplastic copolymer is ethylene-acrylic acid available commercially under the trade name Michem, particularly Michem-4983, by Michelman Corporation. Ethylene-acrylic acid is, typically, produced by high pressure copolymerization of ethylene and acrylic acid. When ethylene is copolymerized with acrylic acid, the molecular structure is significantly altered by the random inclusion of bulky carboxylic acid groups along the backbone and side chains of the copolymer. The carboxyl groups are free to form bonds and interact with any poly substrate. Commercially available ethylene-acrylic acid copolymers are Primacor 4983 sold by Dow Chemical Co., an aqueous dispersion having 25% solids content and obtained from a reaction between 15 mole % acrylic and 85 mol % ethylene. Other acrylic emulsions that may be employed are those sold under the name of Acrylic, particularly Acrylic 79XW318A, 89XWO55 and 90XW067 by Valspar Corporation.

The total amount of the binder can range from about 20% to about 80%, specifically about 30% to about 60% by weight based on the entire weight of the coating composition.

The binder can be entirely acrylic polymer or it can be entirely ethylene-acrylic acid copolymer. For some applications a combination of acrylic polymer and ethylene-acrylic copolymer is preferred. Usually, when there is no acrylic polymer, pigment dispersion is poor and so is adhesion of the coating to the substrate. If there is no ethylene-acrylic acid copolymer, the coating tends to be moisture sensitive. Thus, a balance between the acrylic polymer and the ethylene-acrylic acid copolymer is preferred. When a combination is employed, the preferred amount is 5 to 50% by weight of acrylic polymer and 95 to 50% by weight of ethylene-acrylic acid copolymer. A typical formulation includes 5 to 20 wt. % acrylic polymer and 95 to 80 wt. % ethylene-acrylic acid copolymer based on the entire weight of the combination.

Another component of the formulation comprises at least one ink receptivity enhancing particulate additive.

The particulate additive, often referred to as filler, comprises finely divided inorganic solid materials such as silica, including fumed silica, talc, diatomaceous earth, calcium silicate, bentonite and clay. The amount of filler comprises a substantial percentage of the weight of the coating, typically, about 20% to about 80%, specifically from about 30% to about 60% based on the entire weight of the coating. The particulates are generally small in size, typically ranging from about 1 $\mu$m to about 10 $\mu$m, specifically from about 3 $\mu$m to about 7 $\mu$m. Specific examples of fillers include kaolin, silica (also known for antiblocking properties), aluminum silicates, clay and talc. Pulp may also be employed.

Opacity enhancing particulates which will possibly enhance the ink receptivity of the coating may also be employed. These are relatively inert substances. Calcium carbonate is extensively used in thermoplastics, it is relatively inexpensive and easy to use. It can be used in its natural form but "precipitated calcium carbonate" which is prepared by chemical precesses can be employed. Sometimes, particulates of calcium carbonate are coated with a resin to reduce plasticizer absorption and this form can also be employed.

Particulates which provide pigmentation may also be used. Pigments contemplated are organic and inorganic substances with particle sizes which are rarely less than 1 micron in diameter. Typical pigments include carbon black and titanium dioxide. Calcium carbonate can also act as a pigment. Other pigments not to be excluded by this invention are metallic pigments such as particles of aluminum, copper, gold, bronze or zinc. These pigments are usually flake shaped particles which reflect light when incorporated into the coating vehicle.

The ink absorbing material, opacifying particulates and/or pigment are usually used in combination, depending upon the desired degree of translucency or opacity. Typically the opacifying particulates and/or pigment concentration ranges form about 5% to about 70% of the total particulate concentration of the coating, specifically about 10% to about 45% of the total particulate concentration of the coating.

Further specific examples of particulates which may be employed in addition to those noted above include acetylene black, alpha cellulose, aluminum silicates, barium sulfate, calcium silicate, calcium sulphate, cellulose, clays, diatomite, glass flake, keratin, lignin, lithophone, mica, microballoons, molybdenum disulfide, nepheline syonite, paper, pulp, quartz, shell flour, talc, vermiculite and wood.

The invention further comprises an optional ultra violet stabilizer additive. This is a chemical agent which absorbs or screens out radiation beyond the violet end of the spectrum of visible radiations to prevent radiation catalyzed reactions which degrade plastic. Typical UV absorbers are bezophenone, benzotriazoles, including hydroxyphenyl-benzotriazole, substituted acrylonitriles, salicylic derivatives and nickel complexes. Care must be taken with certain UV stabilizers, such as benzophenone, which may act as a thickening agent. A contemplated UV stabilizer is commercially available benzotriazole "Tinuven 1130" available from Ciba-Geigy, "UV5411" available from Cytec, and "Mixxim BB/200" available from Fairmont. Commercially available benzophenone can be obtained from BASF under the name "Uvinul 3048" or from Great Lakes Chemical under the name "Syntase 230". Another commercially available UV absorber is an oxalanilide sold under the name "VP Sanduvor VSU" by Sandoz. The UV absorber is, typically, used in combination with a free-radical scavenger which halts any UV catalyst reactions. Typical free-radical scavengers include hindered amines including hindered aminoether light stabilizers. Contemplated commercially available hindered amines include "Tinuven 123" sold by Ciba-Geigy, "Uvasil 299" sold by Enichem and "BLS 1770" sold by Mayzo. Commercially prepared UV absorber/free radical scavenger packages are available such as "VP Sanduvor 3225" sold by Sandoz. Typically, when using a UV absorber and a free-radical scavenger in combination, the concentration of free-radical scavenger ranges from about 10% to about 60%, preferably about 20% to about 40% by weight based on the entire amount of UV stabilizer additive employed. The total amount of UV stabilizer additive package that is useful in the coating compositions of this invention comprises about 1 to 15%, specifically 2 to 8% by weight of the entire coating composition. Usually, the UV stabilizers are blended in an hydrocarbon solvent, specifically, alcohol solvent which is miscible with water. Typically, the amount of alcohol employed is sufficient to solubilize the UV stabilizer additives, the amount ranging from about 0.5% to about 5% by weight based on the entire weight of the coating.

The coating composition further comprises, in relatively minor amounts, a surface active agent which facilitates dispersion of the particulates. This component is especially important to disperse the UV stabilizer. Any suitable surface active agent which promotes coating stability can be employed. Anionic emulsifiers are contemplated. They include alkali metal and ammonium salts of the sulfates of alcohols having from 8 to 18 carbon atoms such as sodium lauryl sulfate, alkali metal and ammonium salts of aromatic sulfonic acids such as dodecane-1-sulfonic acid and octadiene 1-sulfonic acid, aralkylsulfonates such as sodium isopropyl benzene sulfonate, sodium dodecyl benzene sulfonate and sodium isobutyl naphthalene sulfonate, alkali metal and ammonium salts of sulfonated dicarboxylic acid esters such as sodium dioctyl sulfosuccinate and disodium N-octadecylsulfosuccinamate, alkali metal or ammonium salts of free acids of complex organic mono and diphosphate esters, and the like. Non-ionic emulsifiers such as octyl or nonylphenyl polyethoxyethanol, and the like, may also be used. Mixtures of the forgoing are also contemplated. A specific emulsifier is the disodium ethoxylated alcohol ($C_{10}$–$C_{12}$) half ester of sulfosuccinic acid available from American Cyanamide Company sold under the tradename Aerosol A-102 or the disodium ethoxylated nonylphenol half esters of sulfosuccinic acid (Aerosol A-103). Another specific emulsifier is the sodium salt of an alkylaryl polyether sulfonate available from Rohm and Haas Company under the tradename "TRITON X-200" or "TRITON X-405" an ethylene oxide derivative. Another useful emulsifier is "TERGITOL 15-5-9".

An effective amount of surface active agent, sufficient to disperse the UV stabilizer and particulates may be used. This amount can range from about 0.5 wt. % to about 10 wt. % of the total weight of the coating, specifically about 1 wt. % to about 7 wt. % of the total weight of the coating.

Traditional coating additives can also be included in the coating of this invention. Typically such materials include modifiers to improve the coefficient of friction, surface slip and antiblocking properties. Specific examples of such modifiers include natural waxes such as paraffin wax, microcrystalline wax, beeswax, carnauba wax, montan wax (lignite wax), etc. and synthetic waxes such as hydrogenated castor oil, chlorinated hydrocarbon waxes, long chain fatty acid amides and the like. Other modifiers that can be added to the coating mixture include one or more wetting agents, crosslinking agents, stabilizers, catalysts, plasticizers, defoamers, slip agents, anti-static agents and antioxidants.

The coating is made by combining all the ingredients sequentially or at the same time and mixing or blending them at room temperature and atmospheric pressure conditions in a conventional mixing apparatus. Typically, the coating is in an aqueous media having a solid content of about 10 to 80%, typically 25 to 60% based on the entire weight of the final coating composition.

Typically the film to be treated with the coating of this inventions is formed by extruding a polyolefin resin, such as polypropylene, through a flat sheet extruder die at a temperature ranging from between about 200° to about 250° C., casting the film onto a cooling drum and quenching the film. The sheet is then stretched about 3 to 7 times in the machine direction (MD) orienter followed by stretching about 5 to about 10 times in the transverse direction (TD) orienter.

The film to be treated with the coating of this invention can include any single or multi-layer thermoplastic material that can be formed into a thin film. Contemplated materials include any polyolefin such as polypropylene, polyethylene, polybutene, polystyrene, polyvinyl chloride, copolymers and blends thereof. Other film materials contemplated include polyethyleneterephthalate and nylon. In multilayer films there are one or more skin layers located on at least one surface of the thermoplastic core layer. The skin layer can comprise polyethylene, including medium and high density polyethylene, polypropylene, copolymer or terpolymer of $C_2$–$C_5$ alpha olefins or blends thereof. At least one side of the film can comprise a heat seal or pressure seal surface. Typical heat seal materials comprise ethylene and propylene homopolymers, copolymers or terpolymers such as ethylene-propylene, ethylene-propylene-butene-1, and polyvinyldichloride polymers. Any of the materials can contain inorganic particulates such as titanium dioxide to enhance the whiteness or color of the substrate or to enhance antiblocking properties.

A primer enhances binding of the coating of this invention to the uncoated film. Typical primers are polymers with good adhesion to the uncoated films such as polyethyleneimine and epoxy resins.

In one embodiment of the invention, the final printed film is adhered to an object. Any conventional glue can be employed to adhere the film. Glues contemplated are pressure sealable, hot melt or water-based. The coating of this invention will not interfere with the adhesive. Thus, the adhesive can be applied to the print side of the film so that the printed surface will face the object to which it is applied. This is useful when it is desirable to read the print through the object, e.g. a glass window or a clear plastic container.

Typically, prior to coating the film with the final formulated composition of this invention, the film surface is treated to create a high energy surface environment sufficient for the adhesion of a primer or other coating such as by flame or corona treatment or other method which can oxidize the film surfaces. Corona treatment is accomplished by exposing the film surface to a high voltage corona discharge while passing the film between spaced electrodes. After electronic treatment of the film surface, the coating can be applied.

Alternatively, the coating can be applied off-line, by any conventional method. For example, the film can be coated by roller coating, spray coating, slot coating or immersion coating. Gravure roll coating or reverse direct gravure coating are acceptable methods. The excess coating solution can be removed by squeeze rolls or doctor knives.

Regardless of the method by which the coating is applied, the amount should be such that upon drying a smooth, evenly distributed layer is obtained. A preferred coating weight ranges from about 3 to 9 $g/m^2$.

The substrate can be of any desired thickness, although thicknesses will typically range from about 20 to about 100 microns for high speed equipment.

In one aspect of the invention, the coating is employed on labels for stretch wrap packaging film.

In any event, the coating composition of this invention may be applied to both surfaces of the film. Alternatively, one surface may have another coating composition applied to it or a substrate such as another polymer film or laminate, a metal foil such as aluminum foil, cellulosic webs, paper, spunbonded polyolefin fiber, a suitable adhesive such as a hot melt or room temperature sealable adhesive or water based adhesive.

It has been found that while the coating of this invention enables thermoplastic films to be used in lithographic printing, the coating also imparts antistatic properties to the film which prevents machine jamming in sheet printers.

Still further, it has been discovered that the coating composition can be especially useful with thermal transfer printing processes. Thus, the present invention also contemplates a method for forming a thermal transfer print image. Typically, thermal transfer printing has been used to print onto paper substrates, due to the difficulty in providing an image having clear resolution onto a plastic film using thermal transfer printing processes. By incorporating the coating composition of the present invention, a method for forming a thermal transfer print image on a plastic substrate can be easily accomplished.

The present process can be used for thermal transfer printing processes in a number of applications, including "on-demand" type digital printing, and is particularly useful for pressure-sensitive decals, bar coding, point application identification labeling such as airline luggage tags, visitor identification badges and the like. Since the present invention accomplishes thermal transfer printing onto plastic films, a variety of applications are contemplated which are not limited by the previously shortcomings in using paper as a printing surface. For example, water resistant substrates for outdoor use are contemplated by the present invention.

In the present method, a thermoplastic substrate is provided with a coating composition as noted above on at least one surface thereof The coating composition can be applied to the thermoplastic substrate in any manner as discussed above, so long as the coating is applied to the surface of the thermoplastic substrate onto which the thermal transfer printing is to occur. It should be noted that both surfaces of the thermoplastic substrate may be coated with the coating composition.

The present invention contemplates the use of any known process for accomplishing thermal transfer printing. A typical thermal transfer printing process is discussed in "Materials for Thermal Transfer Printing" by Anczurowski and Sanders in the *Journal of Imaging Technology* 13: 97–102 (1987), incorporated herein by reference.

In preferred processes, a thermographic element such as a thermographic ribbon is provided, including a support having a dye or ink layer thereon. The dye or ink layer is preferably a pigment dispersed in a carrier such as wax, resin, or a wax/resin blend, thus forming a solid dye or ink. The ink layer has a melting temperature below that of the ribbon substrate and compatible with the heating temperature of the print head. In other words, when the print head is heated, the ink layer should be capable of melting on the ribbon, without causing degradation of the ribbon support. Preferably, the ink layer has a melting temperature from about 60° C. to about 80° C. Alternately, a subliminal-type dye or ink can be used. An example of a commercially available thermographic ribbon is 4065-manufactured by Sony.

The thermographic ribbon is disposed between the thermoplastic substrate having the coating composition thereon and a print head containing a plurality of thermal heating elements. The heating elements of the print head can be image-wise heated, such that specific elements of the print head are individually heated in the desired image for printing.

In thermal transfer printing, the image-wise heated print head directly contacts the thermographic ribbon containing the solid ink, causing image-wise heating of the thermographic ribbon. The image-wise heating of the thermographic ribbon melts the solid ink component of the thermographic ribbon in the form of the desired image. Since the thermographic ribbon is in direct contact with the print surface, i.e. the thermoplastic substrate having the coating composition thereon, the thus-melted ink component is transferred to the thermoplastic substrate having the coating thereon, carrying the pigment to the substrate surface. Since the thermographic ribbon is image-wise heated, only the solid ink on that portion of the thermographic element which is being heated in the image is caused to melt. Thus, when the print surface is contacted with the thermographic ribbon, only the ink which has been melted in the image is transferred to the print surface, thereby causing the image to be transferred to the print surface.

In dye sublimation-type thermal transfer printing processes, it is not necessary to directly contact the substrate surface with the thermographic element in order to transfer the image. Instead, the thermographic ribbon includes a subliminal dye thereon. When the print head heats the thermographic ribbon according to the image desired, the subliminal dye sublimes into a gas. The printing surface substrate having the coating composition coated thereon is positioned adjacent the thermographic ribbon, and is maintained at a temperature below that of the thermographic element. As such, the dye which has been sublimed into a gas transfers to the cold substrate where it condenses. Thus, the dye is transferred to the print surface substrate in the form of the image transferred from the thermographic ribbon.

Since the print surface includes the thermoplastic substrate having the coating composition of the present invention coated thereon, the image can be easily printed onto the print surface without the typical problems associated with thermal transfer printing on plastic films, including smearing or smudging.

Color printing, onto plastic films using thermal transfer printing processes according to the present invention incorporating coating compositions for the plastic films is also contemplated by the present invention.

EXAMPLES

The following Examples 1–3 compare uncoated polypropylene film with polypropylene film coated with various coating compositions according to the present invention, for use in lithographic printing processes.

Comparison Example

Attempting to print uncoated corona treated oriented polypropylene film by lithographic printing results in ink smearing, sticking of film surfaces and high static between sheets of film.

Example 1

A print enhancing coating is prepared by combining 38% ethylene-acrylic acid copolymer ("Michem 4983"), 5.9% acrylic polymer (available from Valspar), 38% SYLOID 221 sold by Davison, a division of W. R. Grace, 15.6% calcium carbonate and 2.5% TRITON X-405 surfactant in aqueous solution.

The coating is applied to a biaxially oriented polypropylene film such as 160LL302 sold by Mobil Chemical Company. The film is made by orienting polypropylene 5 times in the machine direction and 8 times in the transverse direction. The biaxially oriented film is corona treated and primed with a commercial polyethyleneimine primer. The print enhancing coating is applied to the primed surface using a reverse direct gravure coater. The coating, weight is 3 grams/m$^2$. The coating is dried at 105° C. The resulting film is designated Film A.

Example 2

The same surface treated and primed oriented polypropylene film is coated off line as described in Example 1 with the same print enhancing coating except that 6.6% of the coating is replaced with UV stabilizers in amounts of 4.4% Tinuvin 1130 and 2.2% Tinuvin 123. The UV stabilizers are blended in 14% n-butanol solvent. The resulting film is designated Film B.

Example 3

A print enhancing coating is made by combining 19.9% ethylene-acrylic acid copolymer, 10.3% acrylic polymer, 32.4% clay, 25.8% talc, 6.4% titanium dioxide and 5.2% of commercial antistatic, suspension aid and defoamer additives in aqueous solution. This mixture is prepared to a solids concentration of 46 to 48%.

A biaxially oriented polypropylene film such as 260 LLG202 sold by Mobil Chemical Company is treated to a dyne level of 38 dynes/cm. A polyethyleneimine primer sold by Daubert Chemical and which contains 1.9% polyethyleneimine, 0.5% hexocellosolve and 97.6% water is applied to a surface of the film. The print enhancing coating is applied to the primed surface using a reverse direct gravure coater to a coat weight of 3.75 g/m$^2$. The coating is air dried at a temperature of 93° C. The resulting film is designated Film C.

Evaluation of the Coatings from Examples 1–3

Films A and B are evaluated for lithographic ink printability by ink drawn down tests with a commercially available lithographic ink supplied by Flint. The films are also tested on a sheet fed Heidelburg lithopress. In the ink draw down test, ink is applied to the film. Promptly after applying the ink an attempt is made to smear the ink by hand rubbing the freshly printed sheet. The film sample is also visually examined for color bleeding and print definition. The films of the examples demonstrate fast ink absorption, minimal smear and good ink color density. Additionally, the printed sheets are examined to determine whether ink transfers from one sheet to the back of another in a stack of sheets which forms during the printing process. Minimal to no ink transfer is observed.

To determine UV stability, the film samples are cut into two inch strips and exposed to UV light on a QUV Accelerated Weathering Tester following the procedure of ASTM D-4587-86, procedure A. After 1000 hours of exposure, the film sample of example 2 in which the coating contained the UV stabilizer additive shows no physical change. The film sample of example 1 which does not contain the UV stabilizer exhibits unacceptable cracking, yellowing and puckering.

Film sample C is tested using three different lithographic sheet fed presses: Mitsubishi, Harris and Heidelberg. All of the tests are conducted using standard lithographic inks such as those manufactured by Flint or Braden-Sutphil. The printed film demonstrates characteristics similar to paper: excellent smudge resistance and minimal transfer of ink to the facing sheet. Excellent antistatic properties are observed with no jamming of the printing press at 80% of maximum line speed.

Film C is also subjected to accelerated UV testing using the QUV accelerated Weather Tester following ASTM D4587-86, procedure A. There is no noticeable degradation of the film surface even after 750 hours.

The following Examples 4–6 compare uncoated polypropylene film and prior art synthetic paper with polypropylene film coated with various coating compositions according to the present invention, for use in thermal transfer printing processes.

Example 4

Example 4 represents a plastic film known in the art, without any coating composition according to the present invention. The film consists of a biaxially oriented polypropylene film, sold commercially as 160LL302 by Mobil Chemical Company.

Example 5

Example 5 represents an expensive synthetic paper product of the prior art, sold commercially under the name KIMDURA by Kimberly Clark. The KIMDURA product is a biaxially oriented polypropylene film having mineral filled skins, and a clay-based top coating. The film is believed to be produced in accordance with Process (4) disclosed in U.S. Pat. No. 5,233,924. The film is believed to be a finely porous polyolefin type synthetic paper coated on either side with an ethylene-vinyl alcohol copolymer, having a clay filled top coating thereover.

Example 6

Example 6 represents a plastic film incorporating the coating composition of the present invention to provide a high quality, low cost thermal transfer print surface.

A print enhancing coating is prepared by combining 19.9% ethylene-acrylic acid co-polymer, 10.3% acrylic polymer, 32.4% clay, 25.8% talc, 6.4% titanium dioxide and 5.2% commercial antistatic, suspension aid and defoamer additives in aqueous solution. The mixture is prepared to a solids concentration of 46–48%.

A biaxially oriented polypropylene film sold commercially as 260LLG202 by Mobil Chemical Company is treated to a dyne level of 38 dynes/cm. The film is coated with a polyethyleneimine primer sold by Daubert Chemical, which contains 1.9% polyethyleneimine, 0.5% hexocellosolve and 97.6% water. The print enhancing coating is applied to the primed surface using, a reverse gravure coater to a coat weight of 3.75 g/m$^3$. The coating composition is air dried at a temperature of 93° C.

Evaluation of Examples 4–6

The print surface substrates from each of Examples 4–6 were printed using a Zebra 140Xi printer manufactured by Zebra Corp., incorporating the following ribbons:

I I-21 ribbon manufactured by Iimak Corp., representing a ribbon incorporating a hard wax carrier.
II I-28 ribbon manufactured by Iimak Corp., representing a ribbon incorporating a fast wax carrier.
III R2 Prime ribbon manufactured by Iimak Corp., representing a ribbon incorporating a resin carrier.
IV SP330 ribbon manufactured by Iimak Corp., representing a ribbon incorporating a resin carrier.
V PM260 ribbon manufactured by Iimak Corp., representing a ribbon incorporating a premium resin carrier.
VI 4065 ribbon manufactured by Sony Corp, representing a ribbon incorporating a wax/resin carrier.
VII 4075 ribbon manufactured by Sony Corp., representing a ribbon incorporating a resin carrier.
VIII 4080 ribbon manufactured by Sony Corp., representing a ribbon incorporating a wax/resin carrier.

Each of the print surface substrates of Examples 4–6 were printed with the ribbons I–V, and tested for the following characteristics: printing quality at printing speeds of 2 inches per second (ips) and 4 ips; durability based on scratch resistance and durability based on smudge resistance. The printing quality is based on a combination of ANSI grades and aesthetic appearances, with subjective scoring of 1–5, 1 representing poor print quality and 5 representing excellent print quality. The durability testing is based on scratch and smudge resistance testing with an A.A.T.C.C. crockmeter, with subjective scoring of 1–5, 1 representing poor durability and 5 representing excellent durability. The results of these tests are included in Tables I–V.

TABLE I

Thermal Transfer Printing - Ribbon I

| Print Surface Substrate | Print Quality at 2 ips | Print Quality at 4 ips | Scratch Resistance | Smudge Resistance |
|---|---|---|---|---|
| Example 4 | 4 | 4 | 4 | 4 |
| Example 5 | 5 | 3 | 3 | 4 |
| Example 6 | 4 | 4 | 4 | 4 |

As is evident from the results in Table I representing a hard wax thermographic print ribbon, the print surface substrate of Example 6 which represents a coating according to the present invention is equal in print quality and durability to that of the uncoated film of Example 4, and is greater in print quality at 4 ips and in durability based on scratch resistance than the prior art synthetic paper product of Example 5.

TABLE II

Thermal Transfer Printing - Ribbon II

| Print Surface Substrate | Print Quality at 2 ips | Print Quality at 4 ips | Scratch Resistance | Smudge Resistance |
|---|---|---|---|---|
| Example 4 | 4 | 4 | 1 | 2 |
| Example 5 | 4 | 4 | 3 | 4 |
| Example 6 | 4 | 4 | 2 | 4 |

As is evident from the results in Table II representing a fast wax thermographic print ribbon, the print surface substrate of Example 6 which represents a coating according to the present invention is equal in print quality and greater in durability based on scratch resistance and smudge resistance than the uncoated film of Example 4. Further, the inventive film of Example 6 is equal in print quality and in smudge resistance and is only slightly lower in scratch resistance to the synthetic paper product of Example 5.

TABLE III

Thermal Transfer Printing - Ribbon III

| Print Surface Substrate | Print Quality at 2 ips | Print Quality at 4 ips | Scratch Resistance | Smudge Resistance |
|---|---|---|---|---|
| Example 4 | 4 | 4 | 5 | 5 |
| Example 5 | 2 | 2 | 3 | 4 |
| Example 6 | 4 | 4 | 4 | 4 |

As is evident from the results in Table III which represent thermal transfer printing with a resin type thermographic ribbon, the inventive print surface substrate of Example 6 incorporating a coating composition according to the present invention is equal in print quality to the uncoated film of Example 4, while being only slightly less scratch resistant and smudge resistant than the uncoated film. On the other hand, the inventive film is substantially greater in print quality at printing speeds of 2 ips and 4 ips, and more scratch resistant than the synthetic paper of Example 5, while being equal in smudge resistance as the synthetic paper.

TABLE IV

Thermal Transfer Printing - Ribbon IV

| Print Surface Substrate | Print Quality at 2 ips | Print Quality at 4 ips | Scratch Resistance | Smudge Resistance |
|---|---|---|---|---|
| Example 4 | 5 | 5 | 4 | 5 |
| Example 5 | 5 | 5 | 4 | 5 |
| Example 6 | 5 | 5 | 4 | 5 |

As is evident from the results in Table IV which represent an alternative resin thermographic print ribbon, the print surface substrate of Example 6 representing the present invention is equal in print quality and durability as compared with the uncoated film of Example 4 and the prior art synthetic paper product of Example 5.

TABLE V

Thermal Transfer Printing - Ribbon V

| Print Surface Substrate | Print Quality at 2 ips | Print Quality at 4 ips | Scratch Resistance | Smudge Resistance |
|---|---|---|---|---|
| Example 4 | 4 | 4 | 5 | 5 |
| Example 5 | 3 | 2 | 4 | 4 |
| Example 6 | 4 | 4 | 4 | 4 |

As is evident from the results in Table V which represent thermal transfer printing with a premium resin thermographic ribbon, the inventive print surface substrate of Example 6 incorporating a coating composition according to the present invention is equal in print quality to the uncoated film of Example 4, while being only slightly less scratch resistant and smudge resistant than the uncoated film. On the other hand, the inventive film is greater in print quality at printing speeds of 2 ips and 4 ips, and equal in scratch resistance and smudge resistance as compared with the synthetic paper of Example 5.

Each of the print surfaces of Examples 4–6 were printed with the ribbons VI, VII and VIII and tested for scanability. The scanability testing is based on thermal transfer printing of a bar code on the print surface substrate, and scanning the printed bar code with an infrared scanner, with subjective scoring of A representing excellent scanability and B representing good scanability. The results of this scanability testing are shown Tables VI, VII and VIII.

TABLE VI

Thermal Transfer Printing - Ribbon VI

| Print Surface Substrate | Scanability |
|---|---|
| Example 4 | A |
| Example 5 | A |
| Example 6 | A |

As is evident from the results in Table VI representing thermal transfer printing with a combination wax/resin thermographic ribbon, the print surface substrate of Example 6, which represents a plastic film including the coating composition according to the present invention, resulted in excellent scanability, with ratings equal to the uncoated film of Example 4 and the synthetic paper of Example 5.

TABLE VII

Thermal Transfer Printing - Ribbon VII

| Print Surface Substrate | Scanability |
|---|---|
| Example 4 | A |
| Example 5 | A |
| Example 6 | A |

As is evident from the results in Table VII representing thermal transfer printing with a resin type thermographic ribbon, the print surface substrate of Example 6, which represents a plastic film including the coating composition according to the present invention, resulted in excellent scanability, with ratings equal to the uncoated film of Example 4 and the synthetic paper of Example 5.

TABLE VIII

Thermal Transfer Printing - Ribbon VIII

| Print Surface Substrate | Scanability |
|---|---|
| Example 4 | A |
| Example 5 | A |
| Example 6 | A |

As is evident from the results in Table VIII representing thermal transfer printing with a combination wax/resin thermographic ribbon, the print surface substrate of Example 6, which represents a plastic film including the coating composition according to the present invention, resulted in excellent scanability, with ratings equal to the uncoated film of Example 4 and the synthetic paper of Example 5.

A comparison of Examples 4, 5 and 6 as represented by the results shown in Tables I–V demonstrates that with few exceptions, the print quality and durability of the plastic film incorporating the coating composition of the present invention, as represented by Example 6, are at least equal to and in many instances greater than that of the uncoated films of Example 4 and the costly synthetic paper of Example 5. Additionally, Tables VI–VIII demonstrate that the scanability of the plastic film incorporating the coating composition of the present invention is excellent and is equal to that of the uncoated film and the synthetic paper, representing no loss in bar code scanability due to the thermal transfer print enhancing coating composition.

What is claimed is:

1. A thermal transfer print image comprising:
    a polyolefin substrate treated on at least one surface with a coating composition comprising:
    (a) about 20 to about 80 weight percent, based on the entire weight of the coating of a binder composition consisting essentially of about 5 to about 50 percent by weight of a polymer consisting of acrylic acid and about 95 to about 50 percent by weight of an ethylene-acrylic acid copolymer;
    (b) about 20 to about 80 weight percent, based on the entire weight of the coating, of at least one finely divided particulate filler; and
    (c) about 0.5 to about 10 weight percent, based on the entire weight of the coating, of a surface active agent; and
    a thermal transfer dye image on the surface coating with the composition; the dye image transferred to the polyolefin substrate by thermal transfer printing.

2. A method for forming a thermal transfer print image comprising:
    (a) providing a thermoplastic substrate having a coating composition on at least one surface thereof, said coating composition comprising:
    (i) about 20 to about 80 weight percent, based on the entire weight of the coating of a binder composition consisting essentially of about 5 to about 50 percent by weight of a polymer consisting of acrylic acid and about 95 to about 50 percent by weight of an ethylene-acrylic acid copolymer;
    (ii) about 20 to about 80 weight percent, based on the entire weight of the coating of at least one finely divided particulate filler; and (iii) about 0.5 to about 10 weight percent, based on the entire weight of the coating, of a surface active agent;

(b) image-wise hating a thermographic element comprising a support including a dye layer, and (c) transferring a dye image to the surface of the substrate having the coating thereon.

3. A method as in claim 2, wherein the image-wise hating step (b) causes the dye layer to melt and the transferring step (c) is accomplished by directly contacting the print surface with the thermographic element including the melted dye layer.

4. A method as in claim 2, wherein the image-wise heating step (b) causes the dye layer to sublime, and the transferring step (c) is accomplished by positioning the print surface adjacent the thermographic element, thereby causing the sublimated dye layer to condense on the print surface.

5. A method as in claim 2, wherein the surface active agent is an anionic emulsifier or a non-ionic emulsifier.

6. A method as in claim 5, wherein the surface active agent is selected from the group consisting of sodium salt of an alkylaryl polyether sulfonate, ethylene oxide derivative and mixtures thereof.

7. A method as in claim 2, wherein the particulate filler is selected from the group consisting of silica, talc, diatomaceous earth, calcium silicate, bentonite, clay and mixtures thereof.

* * * * *